(12) United States Patent
Wagner et al.

(10) Patent No.: US 8,537,221 B2
(45) Date of Patent: Sep. 17, 2013

(54) LANE CHANGE CONTROL SYSTEM

(75) Inventors: Daniel Wagner, Weinstadt (DE); Frank Lisenmaier, Weinstadt (DE)

(73) Assignee: SMR Patents S.à.r.l., Luxembourg (LU)

( * ) Notice: Subject to any disclaimer, the term of this patent is extended or adjusted under 35 U.S.C. 154(b) by 680 days.

(21) Appl. No.: 12/275,985

(22) Filed: Nov. 21, 2008

(65) Prior Publication Data

US 2009/0153665 A1 Jun. 18, 2009

(30) Foreign Application Priority Data

Nov. 23, 2007 (EP) .................................. 07121384

(51) Int. Cl.
*H04N 9/47* (2006.01)

(52) U.S. Cl.
USPC ........................... 348/149; 348/142; 348/148

(58) Field of Classification Search
USPC ...................................................... 348/149
See application file for complete search history.

(56) References Cited

U.S. PATENT DOCUMENTS

| | | | | |
|---|---|---|---|---|
| 4,905,954 A * | 3/1990 | Taylor | | 248/475.1 |
| 5,642,238 A | 6/1997 | Sala | | |
| 5,670,935 A | 9/1997 | Schofield et al. | | |
| 6,580,373 B1 * | 6/2003 | Ohashi | | 340/901 |
| 6,593,960 B1 * | 7/2003 | Sugimoto et al. | | 348/148 |
| 7,057,500 B1 * | 6/2006 | Belloso | | 340/435 |
| 7,688,221 B2 * | 3/2010 | Watanabe et al. | | 340/901 |
| 7,869,919 B1 * | 1/2011 | Kostrzewa et al. | | 701/36 |
| 2002/0017985 A1 * | 2/2002 | Schofield et al. | | 340/436 |
| 2002/0067557 A1 * | 6/2002 | Coleburn | | 359/842 |
| 2002/0167589 A1 * | 11/2002 | Schofield et al. | | 348/148 |
| 2003/0122930 A1 * | 7/2003 | Schofield et al. | | 348/148 |
| 2004/0057718 A1 * | 3/2004 | Chapman | | 396/428 |
| 2006/0250224 A1 * | 11/2006 | Steffel et al. | | 340/435 |
| 2007/0120657 A1 * | 5/2007 | Schofield et al. | | 340/435 |
| 2007/0171037 A1 * | 7/2007 | Schofield et al. | | 340/438 |
| 2007/0235648 A1 * | 10/2007 | Teich et al. | | 250/330 |
| 2008/0040004 A1 * | 2/2008 | Breed | | 701/45 |
| 2008/0051957 A1 * | 2/2008 | Breed et al. | | 701/36 |
| 2008/0195261 A1 * | 8/2008 | Breed | | 701/2 |
| 2009/0092284 A1 * | 4/2009 | Breed et al. | | 382/103 |

FOREIGN PATENT DOCUMENTS

| | | |
|---|---|---|
| EP | 1 640 215 A1 | 3/2006 |
| FR | 2629027 A2 * | 9/1989 |
| JP | 2000177483 | 6/2000 |
| JP | 2003118487 | 4/2003 |
| JP | 2006338566 | 12/2006 |

OTHER PUBLICATIONS

EPO Search Report and Written Opinion for European Patent Application No. EP 2 062 778 A1 , Apr. 2, 2008.

* cited by examiner

*Primary Examiner* — Richard G Keehn
(74) *Attorney, Agent, or Firm* — Jones Day

(57) ABSTRACT

This invention relates generally to vision systems for vehicles and, more particularly, to rear-view vision systems which provide the vehicle operator with scenic information in the direction rearward of the vehicle. More particularly, the invention relates to a rear-view vision system utilizing image capture devices, such as CMOS imaging arrays in external rear view mirrors to support lane change in a driver assistant system.

14 Claims, 4 Drawing Sheets

LANE CHANGE CONTROL SYSTEM

BACKGROUND OF THE INVENTION

The invention is based on a priority patent application EP 07121384.7 which is hereby incorporated by reference.

This invention relates generally to vision systems for vehicles and, more particularly, to rear-view vision systems which provide the vehicle operator with scenic information in the direction rearward of the vehicle. More particularly, the invention relates to a rear-view vision system utilizing image capture devices, such as CMOS imaging arrays in external rear view mirrors to support lane change in a driver assistant system.

A long-felt need in the art of vehicle rear-view vision systems has been to eliminate or at least minimize exterior rear-view mirrors by utilizing image capture devices, such as cameras, in combination with displays. This would be beneficial because it would reduce wind drag on the vehicle, wind noise and vehicle weight and so in conclusion the C02 emission of the vehicle. Furthermore, rear-view mirrors protrude a substantial distance from the side of the vehicle, which makes manoeuvring in tight spaces more difficult. Image capture devices are capable of positioning in a greater variety of locations on the vehicle, providing more flexibility of vehicle styling. It is further expected that camera systems would greatly reduce the blind spots to the sides and rear of the vehicle common with vehicles equipped with conventional rear-view mirror systems. The driver cannot perceive vehicles, objects, or other road users in such blind spots without turning his or her body, which interferes with forward-looking visual activities.

Camera-based rear-view vision systems for vehicles have not obtained commercial acceptance and are in addition not allowed as stand alone solution under different legislations. One difficulty with proposed systems has been that they present a large amount of visual information in a manner which is difficult to comprehend. This difficulty arises from many factors. In order to significantly reduce blind spots, multiple image capture devices are typically positioned at various locations on the vehicle. The image of an object behind the equipped vehicle is usually captured by more than one image capture device at a time and displayed in multiple images. This may confuse the driver as to whether more than one object is present.

A camera system provides a monocular view of the scene, compared to the binocular, or stereoscopic, view obtained when the scene is viewed through a rear-view mirror. This makes the ability to judge distances in a camera system a problem. This effect is most noticeable at distances close to the vehicle where stereoscopic imaging is relied upon extensively by the driver in judging relative locations of objects. Therefore, known camera systems fail to provide to the driver important information where that information is most needed—at small separation distances from surrounding objects.

Another difficulty with camera systems is that, in order to provide a sufficient amount of information, the camera system typically presents the driver with a greatly increased field of view. This improves performance by further reducing blind spots at the side and rear of the vehicle. However, an increased field of view is often obtained by utilizing a wide-angle lens which introduces distortion of the scene and further impairs the ability of the driver to judge distances of objects displayed. The problem with such distortion of the scene is that the driver must concentrate more on the display and take a longer time to interpret and extract the necessary information. This further distracts the driver from the primary visual task of maintaining awareness of vehicles and other objects in the vicinity of the driven vehicle.

In the U.S. Pat. No. 5,670,935 a rear vision system is disclosed which one image capture device directed rearwardly with respect to the direction of travel of the vehicle. A display system displays an image synthesized from output of the image captive device. A plurality of image capture devices my be provided and the display system displays a unitary image synthesized from outputs of the image captive devices which approximates a rearward-facing view from a single location, such as forward of the vehicle. To establish this system at least three video cameras must be mounted on the vehicle to get the overlaps of view necessary and to avoid blind spot areas. In this patent the information is displayed on a screen again, which makes it obligatory for the driver to adjust eyes between wide and narrow.

Another disclosure US 2006 0250224 describes a solution in which the overview of the near environment of the vehicle is not presented by a video display but by a warning light. The warning light is actuated by a video controlled camera system wherein a first video sensor is located in a rear view mirror and second sensor in the warning light. The warning light is actuated by a video controlled camera system wherein a first video sensor is located in a rear view mirror and second sensor in the rear light of the vehicle. Here the blind spot detection of one side of the vehicle is realized with two video sensors looking along the lanes rearwardly.

The JP 2003118487 discloses two sensors which are used to record video images for a recording system and for a full image display. The sensors are wide angle sensors that can have an inclination versus the vehicle. The system is not used to reduce blind spot and for a lane change assistant.

Many blind spot detection systems are known using several cameras placed at different positions of the vehicle. The use of several cameras in a vehicle makes it necessary to connect the cameras to a communication system, a bus system and to bring electrical connection to the different camera positions in the vehicle. This is an additional effort and additional cost for the manufacturing of the security system.

SUMMARY OF THE INVENTION

The present invention is directed towards easing of visual information in a rear view vision system by significant reduce of necessary equipment which must be installed on a vehicle. The invention allows the use of camera systems at positions where electrical connection is still available.

The invention of a method to support lane changes is based on the use of two exterior video systems that are arranged to have an overlapping view to avoid blind spot areas. The invention uses two video sensors arranged preferably in the rear view mirrors of a vehicle, which allows an optimized position of the overlapping view of the cameras. The advantage of the lane control system is that the use of known blind spot cameras at each side of the vehicle is extended in a way that the cameras allow a full lane change control system.

For rear view mirrors are connected to electrical power and or to a vehicle communication bus for data transfer, the inventional camera system does not need additional wiring of the vehicle.

DETAILED DESCRIPTION OF THE DRAWINGS

Figure 1:
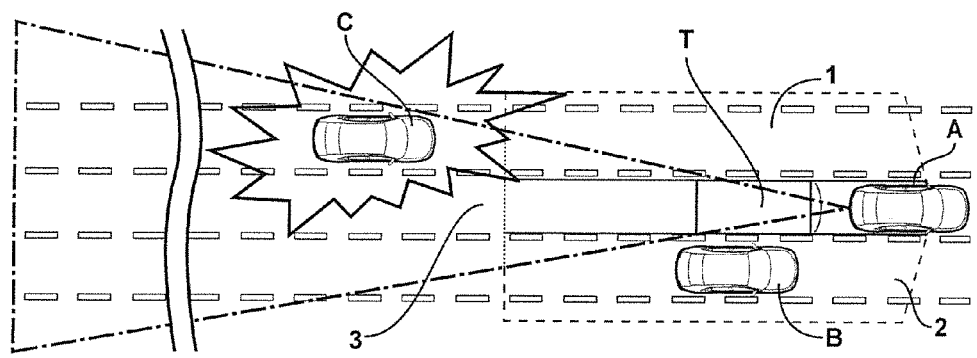
FIG. 1 show a blind sport detection scheme in the prior art (obscuration due to a trailer)
Figure 2:
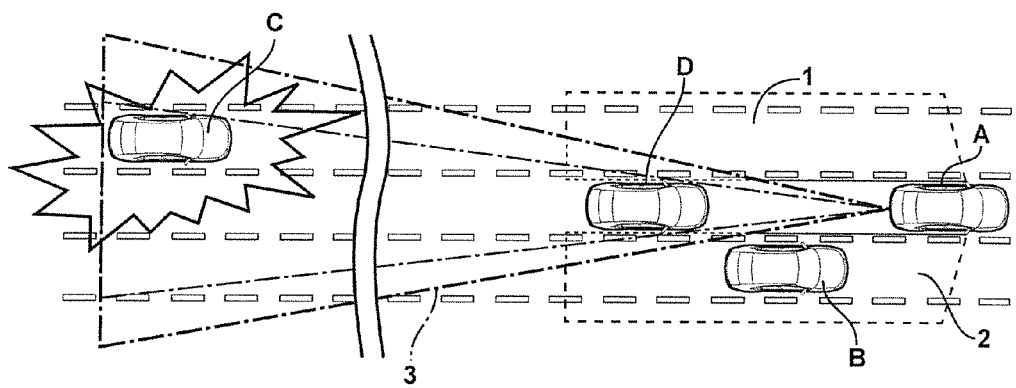
FIG. 2 shows prior art with a different traffic situation (obscuration due to a vehicle)

FIG. 1 shows a top view of a multi-lane road on which three vehicles A, B, C are driving in approximately the same direction. The first vehicle A has two sensors detecting the traffic to the rear. The first sensor is integrated in the exterior mirror on the driver side, while the second sensor is installed in the second rear view mirror. The light grey areas 1 and 2 show the view of the two sensors rearwardly to the travelling direction of vehicle A. The sensors are the normal blind spot detection sensors that allow detecting the approach of a vehicle in the security areas that is defined by the software. The rear ward view of vehicle A is sufficient for the blind spots detection on the both of the vehicle. To control the lanes for a lane change system an additional sensor is installed in the rear of the vehicle with a view 3 marked in dark grey. In the traffic situation of FIG. 1 vehicle A has a trailer T. In vehicle A the approach of vehicle B is detected by sensor of the second rear view mirror in the area 2. The approach of vehicle C is not detected because the view of the blind spot sensors 1 and 2 is limited to a smaller area and mainly because the trailer hides the approach of vehicle C. Also in the traffic situation of FIG. 2 the approach of vehicle C cannot be detected in conventional systems. Here a vehicle D hides the approach of vehicle C. Again sensors in the areas 1 and 2 are not able to detect vehicle C and the view of the central rear sensor is blocked by the following vehicle D.

Figure 3:
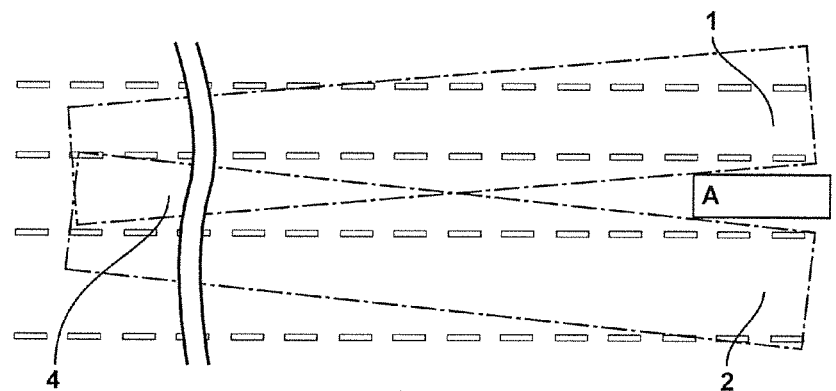
FIG. 3 shows schematic the invention

FIG. 3 shows schematic the idea of the invention. The two sensor areas 1 and 2 are adapted in a way that the views of the two installed sensors are overlapping in the rear of the vehicle. The idea is to extend the approach detection area of the blind sport detection sensors and to incline the angles of view in direction to the vehicle. The angle of inclination is selected in a way that the sensor is looking along the vehicle not or only slightly streaking the vehicle. The objective is to achieve an overlapping area 4 around one to two vehicle lengths behind the vehicle to detect approaching vehicles.

Figure 4:
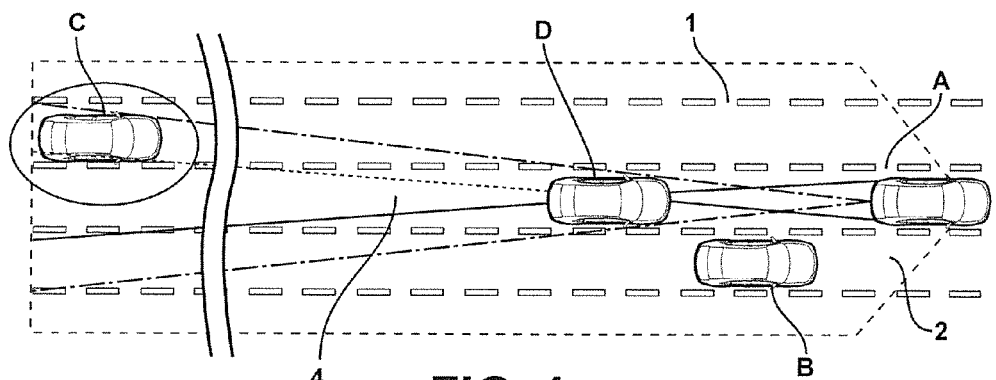
FIG. 4 shows the invention in a traffic situation

FIG. 4 shows a traffic situation using the lane control system to detect approach of all vehicles behind vehicle A. The two installed sensors have detecting areas 1 and 2 which are extended in comparison to the known blind spot detection systems. The areas are slightly inclined versus the travelling direction z of the vehicle A. A vehicle D following vehicle A does not hide the approach of vehicle C any longer. The inclined area 1 detects the approaching vehicle C. The lane change system must detect vehicle far away from the vehicle and estimate the actual velocity of the approaching vehicles.

Figure 5:
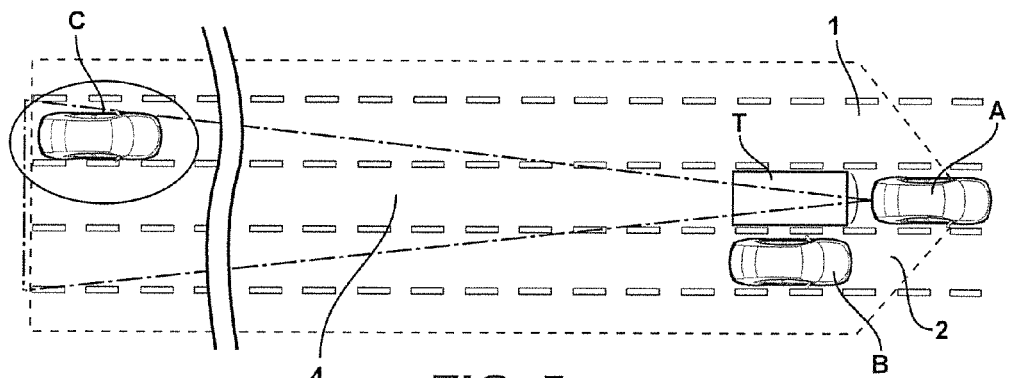
FIG. 5 shows the invention in another traffic situation

FIG. 5 shows a traffic situation in which vehicle A is towing a trailer T. The hidden area behind the trailer was not accessible to known system. But the extended and inclined view of sensors allows that vehicle C is detected.

Figure 6:
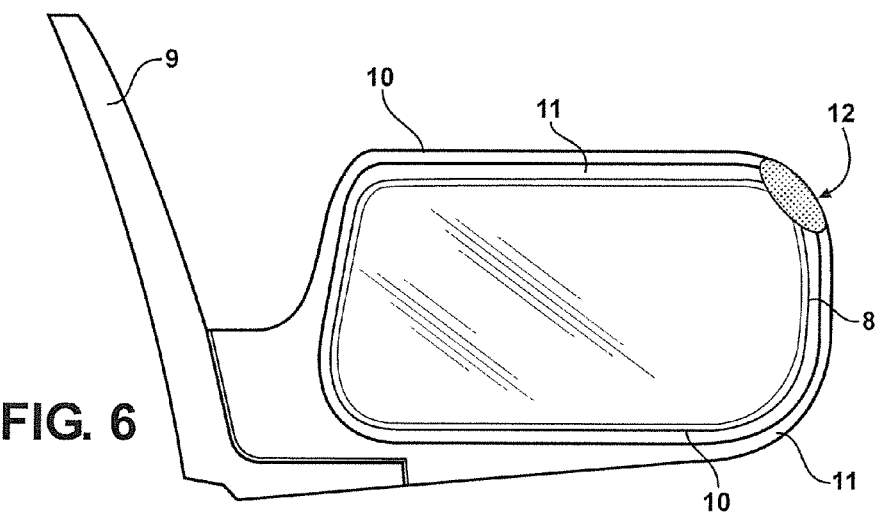
FIG. 6 shows an example for a mirror with sensor
Figure 7:
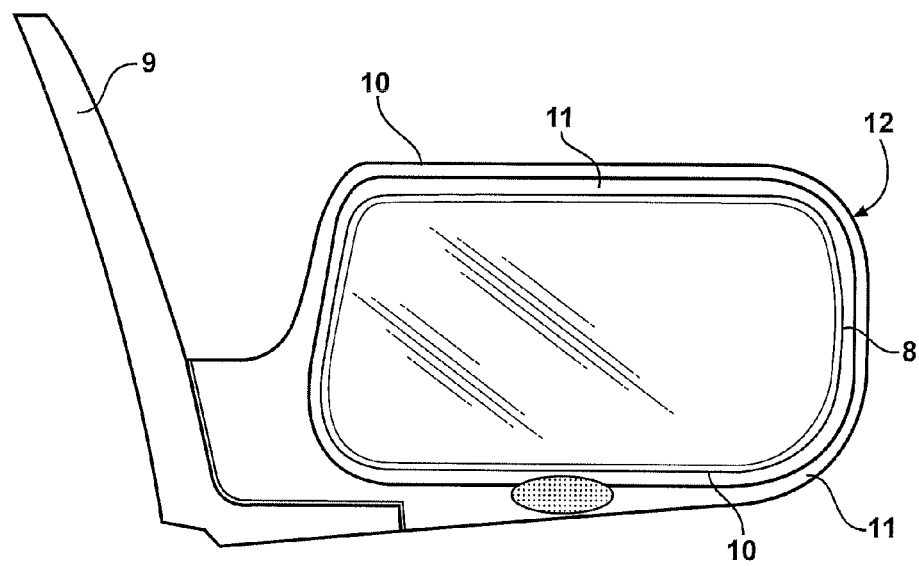
FIG. 7 shows another example for a mirror with a sensor

FIG. 6 shows an example of a mirror 8 including a sensor 12 here positioned at a place away from vehicle. The mirror 8 has in this example a bracket and a mirror head 10 attached at the vehicle 9. The mirror head includes a reflective element 11. The sensor 12 can be portioned at several places as shown in FIG. 7 in a second embodiment. The sensor 12 is integrated in the mirror in this embodiment, it can be also located behind the glass, on the bracket, on the mirror housing or the mirror base.

Figure 8:
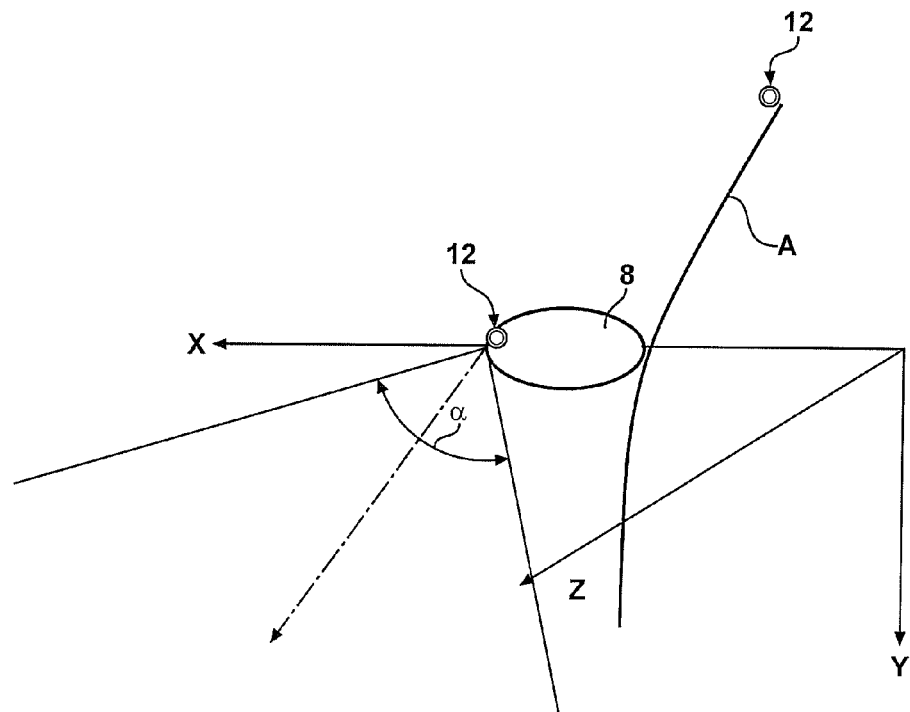
FIG. 8 shows the angel of view of the lane control system

Alternatively, the sensor 12 can be accommodated on the mirror triangle for the outside mirror, on the third side directional signal, or in the grip strip of the driver-side door handle, among other locations shown in FIG. 8 as on the roof of the vehicle.

The sensors 12 can be digital cameras, range-finding cameras, laser systems or radar systems, for example. Motion sensors and other range measurement systems are also possible. Different sensor types can also be combined in a sensor group.

The sensor 12 has an angle of view alpha as shown in FIG. 8 of approximately 60 to 80 degrees, with the line delimiting the field of view 1 nearest the vehicle extending along the outer contour of the vehicle body A; in other words, this delimiting line extends inclined to the direction Z of travel of the vehicle with an angle of around 5 degrees. The detection and/or analysis range is 50 to 150 meters.

Figure 9:
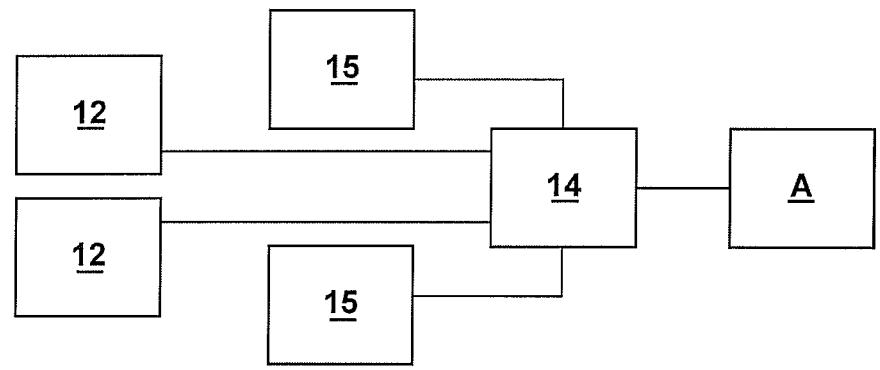
FIG. 9 shows a first system structure
Figure 10:
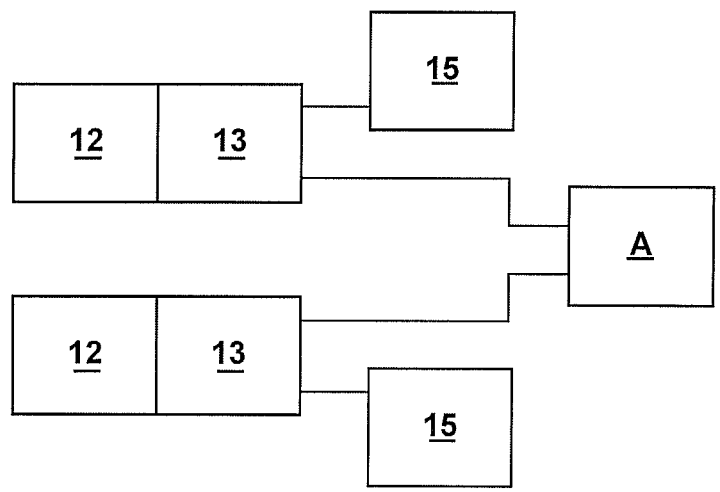
FIG. 10 shows a second system structure

According FIG. 9 the sensors 12 are connected to a controller 13 which is connected to warning outputs 15.
According FIG. 10 the sensors 12 are connected to a central assistance controller 14. The central assistance controller 14 is connected to warning outputs 15. In another embodiment the sensors and controllers are no separate devices but combined in one device. In another embodiment a single warning device is actuated.

Sensors 12 are meant to detect objects in motion, for example driving objects B, C, D which move relative to the vehicle A in such a way that a later collision cannot be ruled out if the driver of vehicle A does not react by changing the direction of travel Z or the speed. Through appropriate processing of the sensor data, the direction of motion, speed, and changes therein, are continuously calculated in an interpretation unit and compared with the comparable data for the vehicle A. From these data are calculated a possible collision point or an encounter that is still collision-free but closer than a minimum distance. Both possibilities are interpreted as a hazardous situation.

Driver lane change control assistance is derived from these data. From the fact that vehicle direction and speed are maintained, or from a change in one or both that increases a risk of collision, the lane change control system interprets that the driver of A does not perceive the approaching object in the exterior mirror blind spot. In a first phase, the system forces the driver to look in the exterior mirrors by means of a lighted or blinking visual signal on or in the vicinity of the exterior mirror. Generally, the driver of A, continuing not to perceive a hazard, will look back over his shoulder on the side facing the appropriate exterior mirror, notice the vehicle B C D to the rear, and react appropriately to avert a danger.

The visual signal from the first warning phase is emitted by a light source in the form of a lamp as described in US 20060250224.

The module can also be arranged in an area of the door that is subjected to moisture. The module can then be designed with IP 67 protection. In this context, the wiring is in the sealed area. Large-volume, sealed connectors can be eliminated. The lens and the CMOS electronics are then glued into the housing.

The software of the lane control system is customer-specific. It can be customized by the driver or the service shop. It can be used for other applications in the vehicle in addition to lane control blind spot system. An interface to the vehicle communication bus of the vehicle must be provided. The settings of the sensors 12 can automatically be compensated depending on the loading of the vehicle. In addition, various operating states or driver-specific settings can be pre-programmed, for example based on the driver's specific field of view. In this regard it is possible to consider the seat position of the driver, the individual visual acuity of the driver, the reaction time of the driver, etc.

The speed of the object B C D relative to that of the vehicle A bearing the lane control system may be minimal. Thus even if two vehicles travelling at approximately the same speed should approach one another during a lane change, this can be detected. Conversely, even stopped vehicles can be detected.

The image sensor of the signal generator produces a black-and-white or colour image. The image produced can thus have a high pixel density.

The visual warning signal in the mirror triangle, or in the mirror/mirror glass the blind spot light is designed such that it elicits a glance at the mirror 8 without turning the head. The warning signal alone thus does not provide complete information about the situation and does not replace a look in the mirror.

The sensors 12 can also be arranged in such locations as on the roof, in the doors, in the rear window, in the trunk lid, etc. The images detected by the sensors 12 and the information determined there from can be stored inside the controller unit or the vehicle together with the operating parameters of the vehicle. In this way, an accident can be reconstructed after the fact. The data can also be transmitted to a removable storage medium. Even wireless transmission is possible, either in real time or at regular time intervals. The data can also already be compressed and processed at this point.

The lane control system can also be connected to other systems assisting the driver, such as assistive braking, assistive lane changing, etc. In this regard, the lane control system can be adapted to the course of travel. If desired, the mirrors are omitted entirely in this case.

The invention claimed is:

1. A lane changing system for a vehicle comprising:
at least two exterior rear view mirrors, each mirror including at least one video sensor, wherein the video sensors detect objects in motion which are moving relative to the vehicle;
at least one analysis and interpretation unit per sensor to determine geometry data and motion data of the object or objects sensed; and
at least one display unit for each sensor,
wherein the video sensors are installed on at least two sides of the vehicle with a view of an overlapping area disposed behind the vehicle in a middle portion of a lane in which the vehicle is traveling,
wherein the video sensors comprise settings, and wherein the lane changing system is configured to adjust the settings of the video sensors depending on a loading of the vehicle, and
wherein the lane changing system is configured to detect approaching vehicles in the overlapping area using the video sensors.

2. A lane changing system according to claim 1,
wherein the video sensors have a view angle at least 3 degrees declining versus a direction the vehicle is traveling and the vehicle contour.

3. A lane changing system according to claim 1,
wherein the overlapping area begins around 10 meters behind the vehicle.

4. A lane changing system according to claim 1,
wherein the sensors have an angle of view of 60 to 80 degrees.

5. A lane changing system for a vehicle comprising:
at least two video sensors,
wherein the at least two video sensors are configured to detect objects in motion which are moving relative to the vehicle,
wherein the at least two video sensors are installed on at least two sides of the vehicle with a view of an overlapping area disposed behind the vehicle in a middle portion of a lane in which the vehicle is traveling,
wherein the at least two video sensors comprise settings, and wherein the lane changing system is configured to adjust the settings of the video sensors depending on a loading of the vehicle,
wherein the lane changing system is configured to detect approaching vehicles in the overlapping area using the at least two video sensors,
wherein the at least two video sensors are each connected to a controller, and
wherein the controller is connected to at least one warning output.

6. The lane changing system according to claim 5,
wherein the at least two video sensors are each attached to separate exterior rear view mirrors of the vehicle.

7. The lane changing system according to claim 5,
wherein at least one of the at least two video sensors is attached to either a mirror triangle of an exterior rear view mirror, a third side directional signal, a grip strip of the driver side door handle, or a roof of the vehicle.

8. The lane changing system according to claim 5,
further comprising an interface to a vehicle communication bus of the vehicle.

9. The lane changing system according to claim 5,
wherein the at least two video sensors are configured to detect moving objects disposed 60 meters through 150 meters behind the vehicle.

10. The lane changing system according to claim 5,
wherein the at least two video sensors are configured to detect moving objects in a lane neighboring the lane on which the vehicle is traveling.

11. A lane changing system for a vehicle comprising:
at least two video sensors associated with the lane changing system,
wherein the at least two video sensors are installed on at least two sides of the vehicle with a view of an overlapping area disposed behind the vehicle in a middle portion of a lane in which the vehicle is traveling,
wherein the at least two video sensors are each configured to detect moving objects in a lane neighboring the lane on which the vehicle is traveling at the side of the vehicle the video sensor is installed,
wherein the at least two video sensors comprise settings, and wherein the lane changing system is configured to adjust the settings of the video sensors depending on a loading of the vehicle; and
wherein the lane changing system is configured to detect approaching vehicles in the overlapping area using the at least two video sensors when the approaching vehicle is hidden to one of the at least two video sensors.

12. The lane changing system according to claim 11,
wherein the vehicle comprises exterior rear view mirrors, and
wherein the lane changing system is configured to produce a visual warning signal in the vicinity of the exterior rear view mirrors.

13. The lane changing system according to claim 11,
wherein the lane changing system is configured to store images detected by the at least two video sensors.

14. The lane changing system according to claim 11, wherein the lane changing system is connected to either a vehicle communication bus and/or an assistive braking system of the vehicle.

* * * * *